(12) United States Patent
Scott

(10) Patent No.: US 7,582,847 B2
(45) Date of Patent: Sep. 1, 2009

(54) SYSTEM FOR MAKING BRACES FOR DIES

(75) Inventor: Wesley Elton Scott, Kitchener (CA)

(73) Assignee: 1500999 Ontario Inc., Kitchener, Ontario (CA)

( * ) Notice: Subject to any disclaimer, the term of this patent is extended or adjusted under 35 U.S.C. 154(b) by 0 days.

(21) Appl. No.: 10/959,985

(22) Filed: Oct. 8, 2004

(65) Prior Publication Data

US 2005/0106526 A1    May 19, 2005

Related U.S. Application Data

(60) Provisional application No. 60/509,867, filed on Oct. 10, 2003, provisional application No. 60/509,868, filed on Oct. 10, 2003.

(51) Int. Cl.
*B23K 10/00* (2006.01)
*B23P 15/24* (2006.01)
*B21D 37/20* (2006.01)

(52) U.S. Cl. ............... 219/121.56; 219/121.54; 219/121.39; 83/455

(58) Field of Classification Search ............ 219/121.56, 219/121.58, 121.39, 121.44; 700/162, 152; 83/53, 177, 939–941, 455
See application file for complete search history.

(56) References Cited

U.S. PATENT DOCUMENTS

| | | | |
|---|---|---|---|
| 4,951,217 A | | 8/1990 | Clack et al. |
| 4,998,206 A | | 3/1991 | Jones et al. |
| 5,117,366 A | | 5/1992 | Stong |
| 5,168,610 A | * | 12/1992 | Ichimura et al. ........... 29/33 J |
| 5,436,423 A | * | 7/1995 | Welty .................. 219/121.39 |
| 5,763,852 A | * | 6/1998 | Brolund et al. ........ 219/121.44 |
| 5,892,345 A | * | 4/1999 | Olsen ........................ 318/571 |
| 6,066,824 A | * | 5/2000 | Crawford et al. ......... 219/86.31 |
| 6,233,809 B1 | | 5/2001 | Geffros et al. |
| 6,320,153 B1 | * | 11/2001 | Hulings et al. ......... 219/121.39 |
| 6,459,958 B1 | * | 10/2002 | Watanabe et al. ........... 700/264 |
| 6,473,671 B1 | | 10/2002 | Yan |
| 6,609,044 B1 | * | 8/2003 | Basista et al. ............... 700/166 |
| 6,772,040 B1 | * | 8/2004 | Picard et al. ............... 700/166 |
| 7,082,804 B2 | * | 8/2006 | Scott et al. .................. 72/307 |
| 2002/0013639 A1 | * | 1/2002 | Fujishima et al. ........... 700/175 |
| 2002/0129893 A1 | * | 9/2002 | Winter et al. .............. 156/283 |

(Continued)

FOREIGN PATENT DOCUMENTS

WO     WO 03062109 A1 *    7/2003

*Primary Examiner*—Tu B Hoang
*Assistant Examiner*—Stephen J Ralis
(74) *Attorney, Agent, or Firm*—Bereskin & Parr LLP

(57) ABSTRACT

A system and method for producing braces for a cavity die having a predetermined shape are disclosed. The system includes an input file containing information about the shape of the cavity die and a bracing program running on a computer. The bracing program produces an output file based on the input file and brace parameters. The output file includes information about the design of the braces. The computer instructs a brace-making machine to produce the braces based on the information in the output file. The method includes the steps of: a) providing input information about the shape of the cavity die and the brace parameters to the computer; b) processing the input information by the computer to produce an output file containing information about the design of the braces; and c) producing the braces in accordance with the information from the output file.

6 Claims, 14 Drawing Sheets

U.S. PATENT DOCUMENTS

2002/0151420 A1* 10/2002 Scott et al. .................... 483/29
2003/0113178 A1* 6/2003 Podmiglazov .............. 409/132
2003/0125825 A1* 7/2003 Liu ............................ 700/97
2005/0005664 A1* 1/2005 Scott et al. .................... 72/307
2006/0059970 A1* 3/2006 Scott et al. .................... 72/307
2006/0230805 A1* 10/2006 Scott et al. .................... 72/307

* cited by examiner

SYSTEM FOR MAKING BRACES FOR DIES

This is an application claiming the benefit under 35 USC 119(e) to U.S. Provisional Patent Application Ser. Nos. 60/509,867 and 60/509,868, both filed Oct. 10, 2003. U.S. Provisional Patent Application Ser. Nos. 60/509,867 and 60/509,868 are incorporated herein, in their entirety, by this reference to them.

FIELD OF THE INVENTION

This invention relates to a system and method for producing braces for a cavity die. The invention may also have application in other fields in which a strip material must be cut to fit to a boundary.

BACKGROUND OF THE INVENTION

U.S. Pat. No. 6,233,809 describes a cutting knife that can be detachably connected to a baseboard. The cutting knife extends in a perpendicular direction to the baseboard and circumscribes the knife cavity on the baseboard. At least one elongated cross member is affixed to the cutting knife and extends across the knife cavity. The cross member is mounted to the baseboard by a removable fastener. The cutting knife may then be removed from the baseboard and re-secured. The cutting knife described in the '809 Patent does not provide any means for designing and producing braces for cutting knives of various shapes.

Accordingly, there is a need for systems and methods for more easily designing and producing braces for dies.

SUMMARY OF THE INVENTION

It is an object of the invention to improve on, or provide a useful alternative to, the prior art. It is also an object of the invention to provide systems or methods for designing or producing braces for dies or designing or cutting a strip material to fit a boundary. The following summary is intended to introduce the reader to the invention by not to define the invention. The invention may reside in a combination or sub-combination of elements or steps found in this or other parts of this document, for example in the claims.

According to a first aspect of the invention, a system for producing a brace for a cavity die having a predetermined shape is provided. The system comprises: a) an input file containing information about the predetermined shape of the cavity die; b) a data processor configured by a bracing program to produce an output file from the input file and a plurality of brace parameters, wherein the output file comprises information about the design of the brace; and c) a brace-making machine adapted to produce the brace, the brace-making machine adapted for communication with the data processor; wherein the data processor is adapted to instruct the brace-making machine to produce the brace from the information in the output file.

According to a second aspect of the invention, an apparatus for producing a brace for a cavity die from a strip of material is provided. The apparatus comprises: a) a bed for supporting the strip of material; b) a material feeder for moving the strip of material in a first direction; c) a cutting tool movable in a second direction across the strip of material; and d) a control system for coordinating the movement of the material feeder and cutting tool to make a desired cut in the strip of material.

According to a third aspect of the invention, a method of producing a brace for a cavity die having a predetermined shape is provided. The method comprises: a) providing input information to a data processor, the input information comprising information about the predetermined shape of the cavity die and brace parameters; b) processing the input information by the data processor to produce an output file containing information about the design of the brace; and c) producing the brace in accordance with the information from the output file.

According to a fourth aspect of the invention, a method of producing an output file containing information for the design of braces for a cavity die having a predetermined shape is provided. The method comprises: a) providing input information to a data processor, the input information comprising information about the predetermined shape of the cavity die and brace parameters, the brace parameters comprising brace width, starting brace centre point from edge, minimum brace spacing and maximum brace spacing; and b) processing the input file and the brace parameters to produce the output file, wherein the processing step comprises:

i) drawing a pair of edge braces having parallel centerlines and located at the starting brace center point from edge distance from the furthest points of the cavity die perpendicular to the centerline of the edge braces, the edge braces having a constant width equal to the brace width and end profiles determined by intersection with the shape of the cavity die; and ii) if the distance between the edge braces is greater than the maximum brace spacing, drawing a number of interior braces having centerlines parallel to the edge braces and regularly spaced between the edge braces, the number being the lowest number such that the regular spacing is between the minimum brace spacing and maximum brace spacing, the interior braces having a constant width equal to the brace width and end profiles determined by intersection with the shape of the cavity die.

According to a fifth aspect of the invention, a computer readable medium having a computer program recorded thereon for producing an output file containing information for the design of braces for a cavity die having a predetermined shape is provided. The computer program causes the computer to perform the steps of: a) accessing information about the predetermined shape of the cavity die; b) accessing brace parameters relating to the location of the braces, the brace parameters comprising brace width, starting brace centre point from edge, minimum brace spacing and maximum brace spacing; and c) processing the input file and the brace parameters to produce the output file, the processing step comprising:

i) drawing a pair of edge braces having parallel centerlines and located at the starting brace center point from edge distance from the furthest points of the cavity die perpendicular to the centerline of the edge braces, the edge braces having a constant width equal to the brace width and end profiles determined by intersection with the shape of the cavity die; and ii) if the distance between the edge braces is greater than the maximum brace spacing, drawing a number of interior braces having centerlines parallel to the edge braces and regularly spaced between the edge braces, the number being the lowest number such that the regular spacing is between the minimum brace spacing and maximum brace spacing, the interior braces having a constant width equal to the brace width and end profiles determined by intersection with the shape of the cavity die.

BRIEF DESCRIPTION OF THE DRAWINGS

One or more embodiments of the invention will now be described, by way of example, with reference to the following figures.

DETAILED DESCRIPTION OF THE PREFERRED EMBODIMENT

Figure 1:
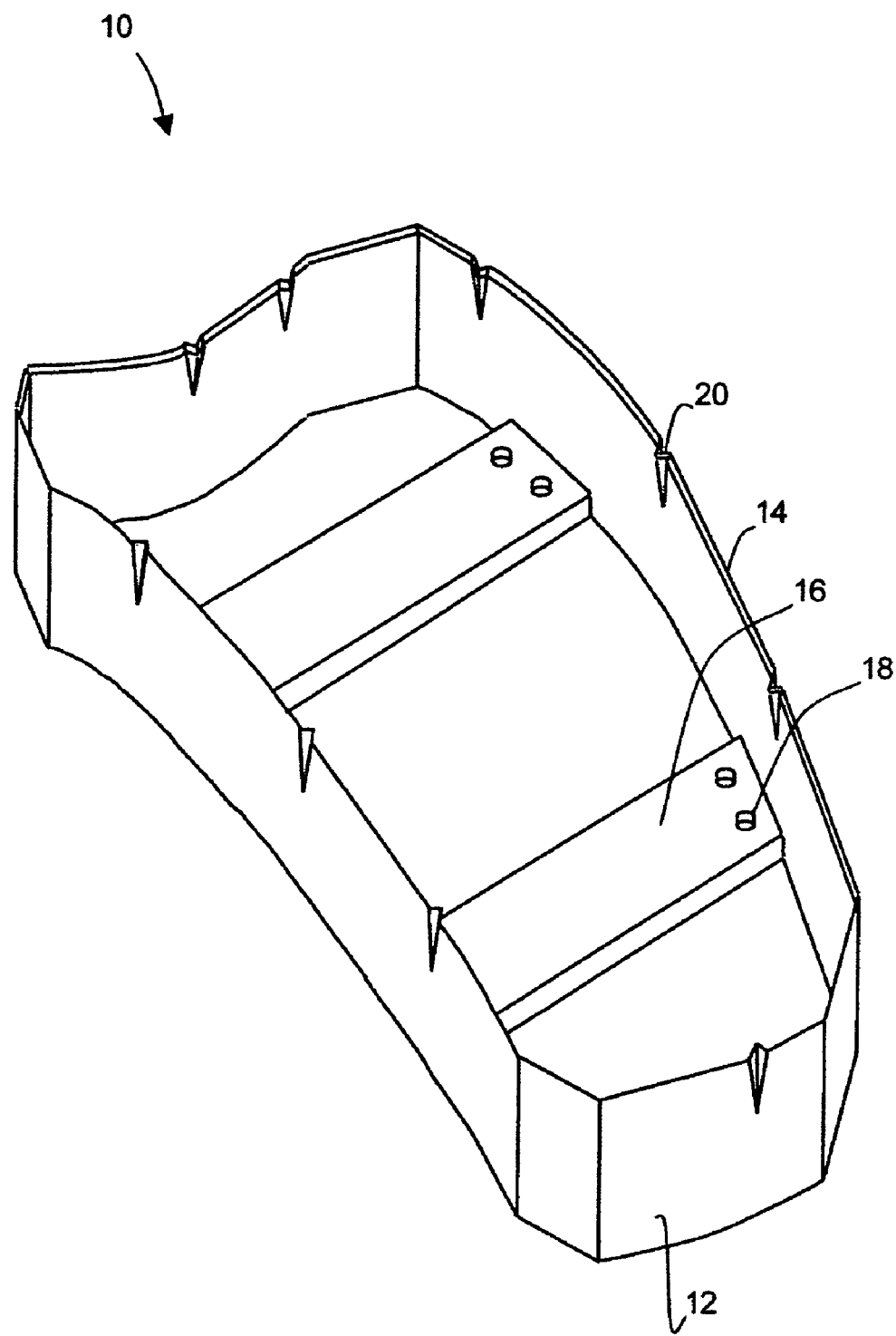
FIG. 1 is an isometric view of a braced cutting die.

FIG. 1 is an isometric view of a cutting die 10. Cutting die 10 has a knife 12 constructed from a strip of material having a cutting edge 14 on one of its sides. The knife 12 is bent at various angles to provide a closed predetermined shape or cavity defined by the point of the cutting edge 14. The knife 12 is typically made from steel. The cutting edge 14 may have various types of bevel such that the point of the cutting edge 14 may be in the centre of the thickness of the knife 12, offset to one side, or at one edge of the knife 12. Depending on the application, the knife 12 may have perforations in its sides, gates cut out of the cutting-edge 14, or notches cut out of the non-cutting edge.

The die 10 also has braces 16 which serve a number of purposes. Depending on the application, these purposes may include one or more of: (i) supporting the knife 12 or helping to maintain the shape of the die; (ii) distributing the forces from the die 10 to a base board (not shown), (iii) providing a means for mounting dies to a base board, and (iv) providing a means for mounting other items, such as cut-outs, punches, stabs or slit knives, to the die 10.

Continuing to refer to FIG. 1, the braces 16 are typically located within the area bounded by the knife 12 to avoid interfering with any adjacent dies mounted to the same base board. The braces 16 are typically made of steel and welded at their ends to other braces 16 or to the knife 12. The braces may be cut from a strip of material (also known as "strip stock"), their ends being cut to match the inner surface of knife 12, or any other surface to which they are attached, to within the tolerances required by welding or any other method of attachment used. In the case of a die 10 intended to be mounted flush with the surface of a baseboard, as for the die 10 shown, the braces 16 are mounted flush with non-cutting edge of the knife 12 and include holes 18 for inserting a fastener, such as a screw, to attach the die 10 to a baseboard. For other sorts of dies, the braces may be located in different locations. For example, for dies in which the knives 12 will be embedded into a baseboard, the braces 16 may be located at a point between the two edges of the knife so as to contact or remain above the baseboard when the knife 12 is pounded into the baseboard. The knife 12 may also have nicks 20, also called marker notches, which are used, for example, to provide alignment or folding tabs in the material to be cut by the die 10. The nicks 20 may extend only partially into the knife 12 as shown or may extend to the non-cutting edge of the knife 12. If the nicks 20 extend through the plane of the braces 16, the braces 16 may be cut to the contour of the nicks 20 or the location of the braces 16 may be adjusted to avoid the nicks 20.

FIGS. 2A to 2F show plan views of a selection of dies 10 of various shapes. As shown in the figures, the braces can have a variety of configurations and locations. For example, die 10a in FIG. 2A includes braces 16a extending between interior surfaces of the knife 12a. The braces 16a' shown closest to the left or right side of the die 10a may be called edge braces. The other brace 16a" may be called an interior brace. Braces 16p, which may be called supports, may be attached, for example by welding, between the other braces 16. Other braces 16b, which may be called tabs, may be attached, for example by welding, between the interior surface of the knife 12a and a brace 16a. Die 10b in FIG. 2B includes a set of braces 16c extending parallel to each other and additional braces 16d and 16e that are not parallel to braces 16c. Die 10c in FIG. 2C includes a set of braces 16f supporting the knife 12c and an additional brace 16g, which may be called a cross-brace, supporting a punch 22. Aside from the punch 22, the cross-brace 16g might support other items, such as cutouts, stabs or slit knives, in position relative to the knife 12. The punch 22 or other items may be attached to a brace 16 by various means including welding, fasteners, such as screws or clips, or a press fit into a hole in the brace 16. Multiple braces 16 may be used to support large punches or other items. The cross-braces 16g may be separate braces provided only to provide a punch or other item or may be braces 16 provided for other purposes that additionally perform the function of a cross-brace 16g.

Figure 2A:
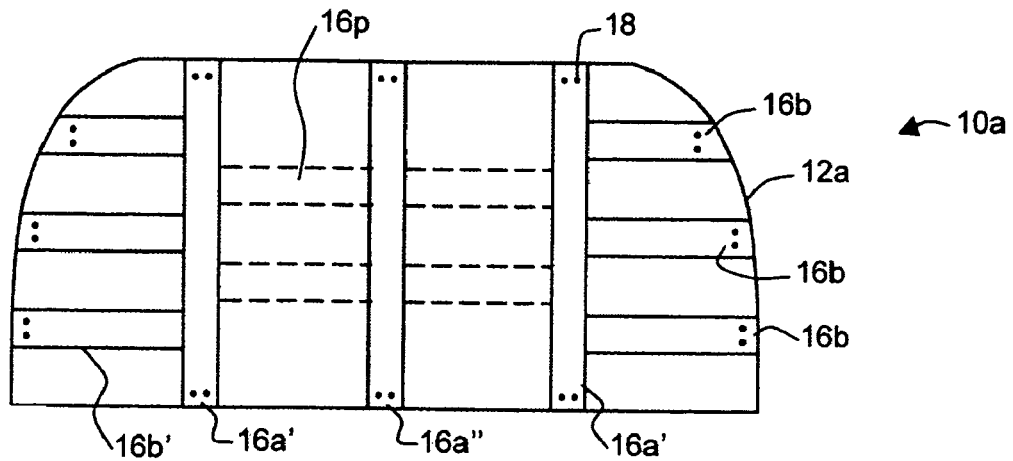
FIGS. 2A through 2F are plan views of a selection of dies of various shapes.
Figure 2B:
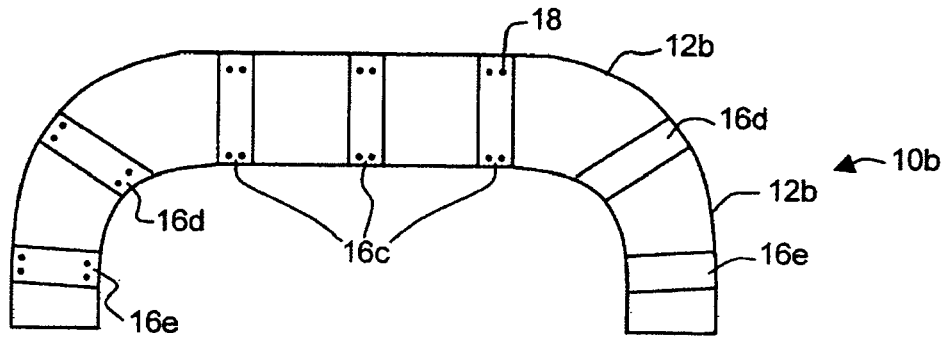
Figure 2C:
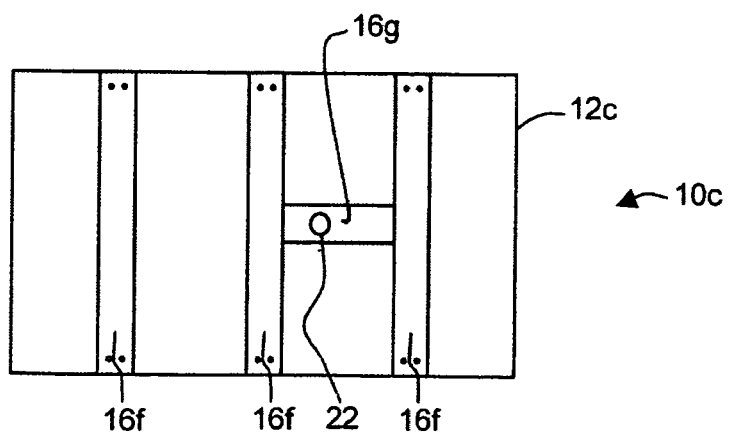
Figure 2D:
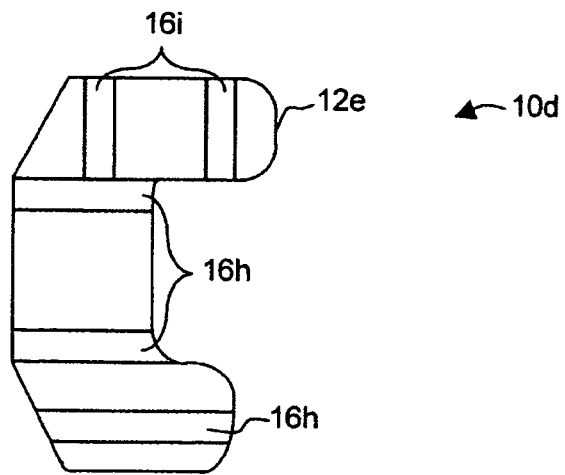
Figure 2E:
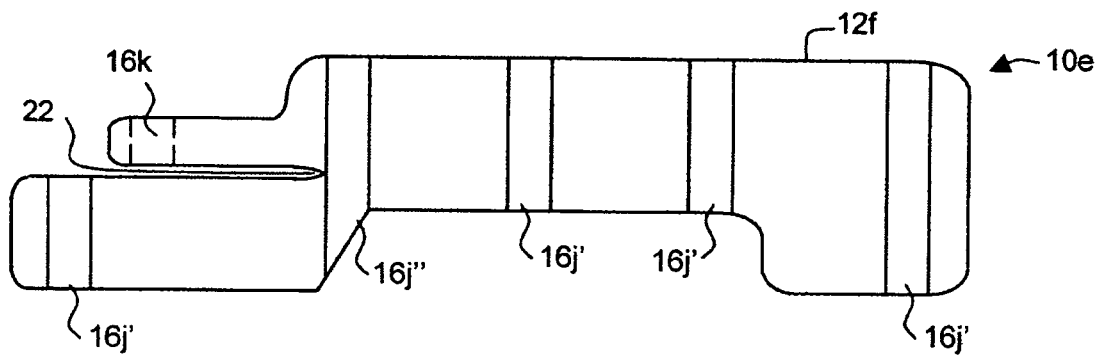
Figure 2F:
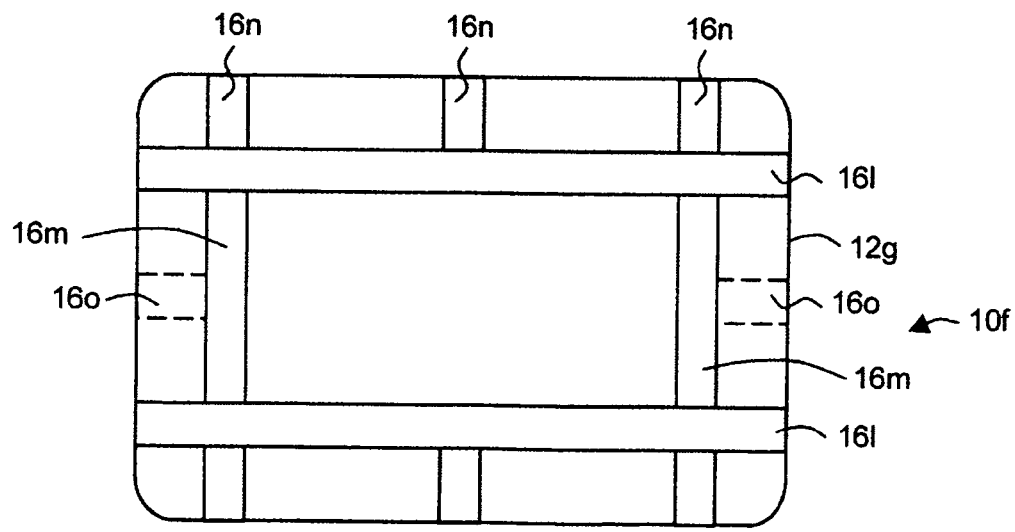

The dies 10 and braces 16 described in FIGS. 2A-C are typical of the majority of dies 10. However, dies 10 of unusual shapes occur from time to time and may be braced to account for their unusual shape. For example, die 10d in FIG. 2D has a set of braces 16h parallel to one direction and a second set of braces 16i parallel to another direction. The two directions each correspond to the shape of a part of the die 10d. The two directions are generally perpendicular to each other in the die 10d although other dies may have directions at other angles to each other. The die 10e of FIG. 2E has a set of braces 16j' spaced at multiples of a constant spacing interval and a brace 16j" spaced at a different spacing. The location of brace 16j" is adjusted to support the interior corner 22 of the knife 12f but without requiring a cut in the side of brace 16j". Brace 16k may also be added to reinforce the peninsula in die 10e. Die 10f in FIG. 2F has braces 16m and 16l, which may all be called edge braces, forming a closed shape, such as a rectangle, inside of the knife 12g. Braces or tabs 16n extend from brace 16l to the knife 12g. Brace 16l also extends to the knife 12g but may optionally extend only to the outside edge of brace 16m. In that case, tabs may be added to replace the lost extensions of brace 16l and provide connection with the knife 12g either in the same location as the lost extensions of braces 16l or in other locations. Additional tabs 16o may be added. The bracing scheme used in FIG. 2F can be generally described as having a set of braces 16 forming a closed shape within the die 10f and having a set of tabs 16n, 16o and the extensions of 16l, extending to the knife 12g.

Dies 10 of shapes other than those shown in FIGS. 2A through 2F may also occur in practice and braces 16 as described in one or more of these figures may be selected, combined or adapted to provide bracing.

Figure 3:
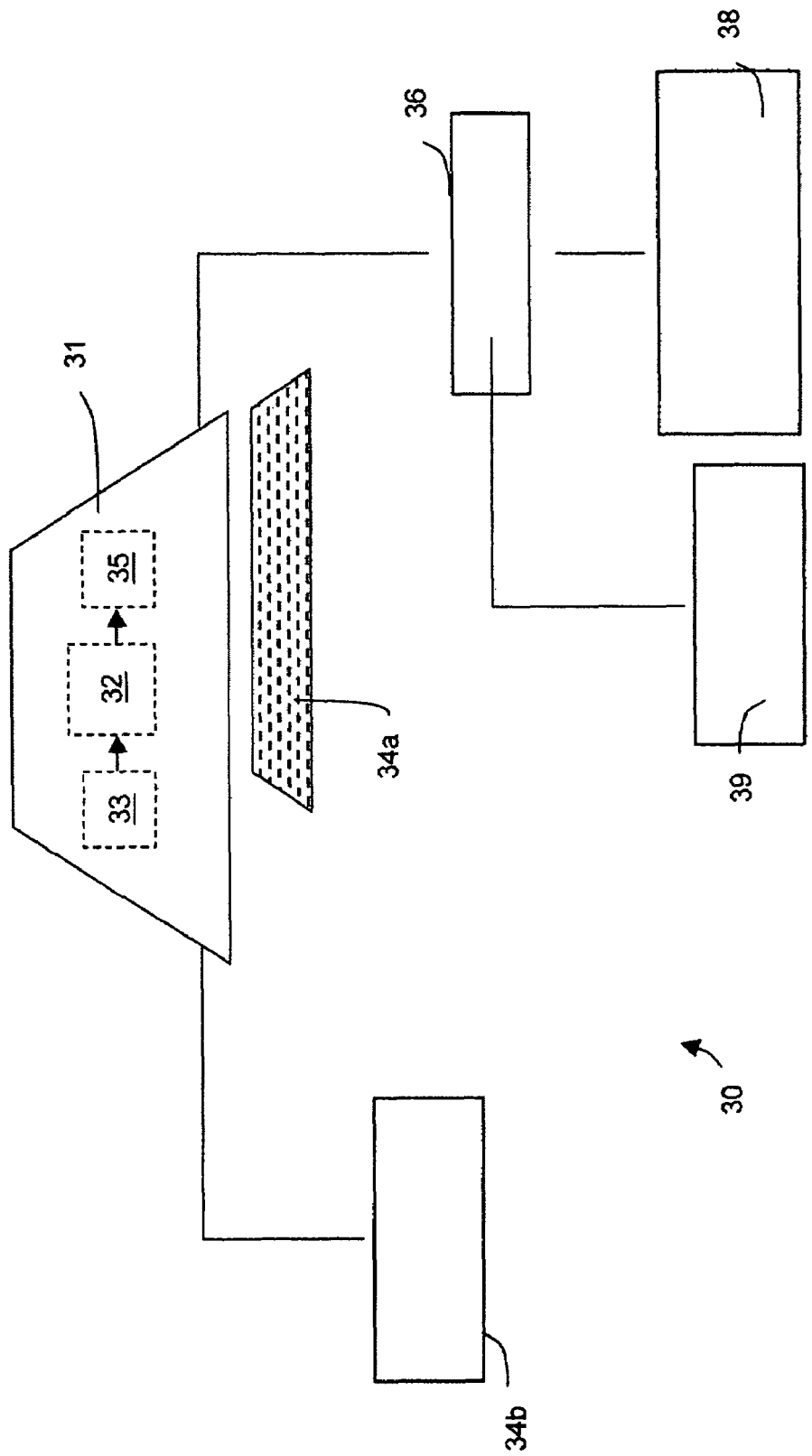
FIG. 3 is a schematic representation of a brace making system.

FIG. 3 shows a system 30 for making braces in accordance with a preferred embodiment of the present invention. The system includes any suitable data processor, such as a computer 31 which executes instructions from a bracing program 32 (described in detail below) loaded thereon. Input devices, such as a keyboard 34a and drive 34b, or other input devices, allow for the input of an input file 33, and optionally brace parameters, to the computer 31. An output file 35 with information, for example regarding the shape of one or more braces to be cut, may be communicated from the computer 31, optionally via any suitable communications network 36, to a brace-making machine 38 (also referred to as the apparatus) described in detail below. The brace-making machine 38 receives the output file, reads the output file to determine the shape of one or more braces 16 to be cut, and cuts the one or more braces 16. Alternately, the output file from the computer 31 may be output, optionally through the communications network 36, to a printer or plotter 39. The printer or plotter 39 reads the output file and produces a drawing showing the shape of one or more braces 16 to be cut. The printer or plotter 39 may also produce a drawing showing braces 16 in position in a die 10 to be braced to aid in later assembly of the die 10.

Figure 4:
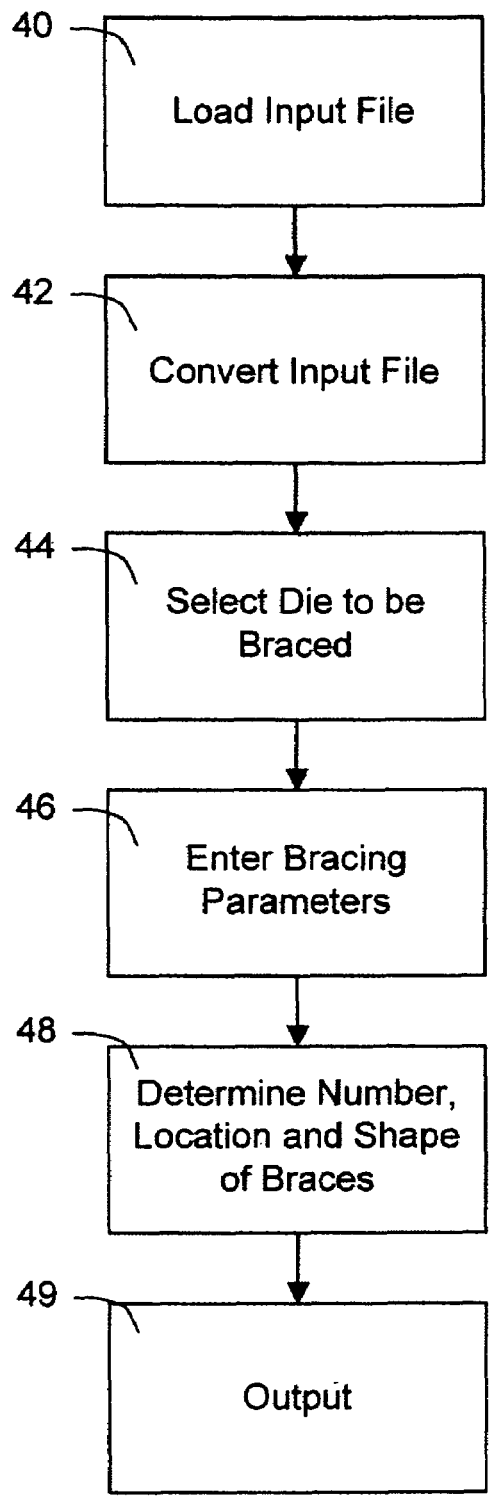
FIG. 4 is a flow chart of steps followed to determine the shape and location of braces.

The operation of the computer 31 running the bracing program 32 will now be described with reference to FIGS. 1, 3, and particularly FIG. 4.

The operation begins at step 40, where the input file 33 is loaded into the bracing program 32. The input file 33 includes information about the shape of the die 10 to be braced. To load the input file 33, a user may, for example, browse through and select a file from one or more folders of available files on drive 34b, or otherwise specify a file to be loaded. The input file 33 may correspond to an article of manufacture or production run and may contain information on the shape of a number of different dies.

The bracing program 32 is adapted to read the input file 33 in one or more forms and according to one more protocols. For example, the input file may be a Data Exchange File (DXF) file created in a separate drafting program, such as AutoCAD™ as supplied by Autodesk Inc., which contains information about the shape of the die. The die shape is made up of several line segments, for example segments corresponding with the shape enclosed by the point of the cutting edge 14.

The protocol may include rules for preparing or formatting the information within the DXF file. For example, the bracing program may require that all data relating to the shape of a die 10 be tagged with a group code number distinct from the group code number of any other information in the file. This allows the bracing program to identify and separate information relating to the shape of a die 10 to be braced from information relating to other dies 10 or title blocks, notes, or other information in a file. In files prepared in AutoCAD™, this is achieved by placing the information relating to the shape of the die in a distinct BLOCK enclosed by BLOCK . . . ENDBLK. Multiple dies can be included in an input file as long as each is included in its own block and the ENTITIES section is set to display all shapes if required to allow an operator to choose the die 10 of interest. The protocol also includes rules regarding the scale and units to be used, for example, that the scale will be 1:1 and all units will be inches.

The protocol may also include rules prohibiting any type of shape description not understood by the bracing program, which may include, for example, ARC or POLYLINE functions in AutoCAD. Alternately, the bracing program 32 may be modified to avoid the need to address some or all of these issues in the protocol. For example, the bracing program 32 may be modified to read ARC or POLYLINE functions and convert them to a series of line segments.

Other rules may also be included in the protocol to aid the bracing program 32 in performing various functions. For example, rules may relate to the organization of information about a die 10 within layers of a block. For example, the basic shape of the die 10, or the point of its cutting edge 14, may be included on one layer while information on the location of punches or other internal features of a die may be placed on separate layers. This allows the bracing program 32 to locate information required for certain steps and separate the required information from other information contained in the complete file for the die 10. Alternately, the bracing program 32 may be modified to solve or bypass issues addressed in the protocol so that the protocol may be simplified. For example, the bracing program 32 may be modified to include routines which scan the input file 33 and identify perimeters of dies and features inside the perimeter of a located die such that information does not need to be provided in blocks or layers as described above.

In step 42, the input file 33 is converted if required. Although step 42 is shown as part of the bracing program 32, a separate program may also be used to perform the conversion either before a file is input to the bracing program 32 or upon receiving a file exported from the bracing program. Step 42 may also be embodied in one or more routines of the bracing program 32 which run automatically, optionally without input from a user or reporting to a user. Further, step 42 may be broken into various component steps or conversions performed by one or more separate programs or subroutines of the bracing program 32 at other suitable locations within the overall process or at dispersed locations within the overall process.

Step 42 may include operations to bring an input file into compliance with the protocol. For example, step 42 may include moving information in an input file between blocks so that all information regarding the shape of a die 10 is located in a distinct block for each die 10. Un-supported shape information, such as a POLYLINE, may be converted to a series of line segments.

Step 42 may also include operations to facilitate the work of the bracing program 32 in place of expanding the protocol or requiring other operations later in the overall process. For example, nicks 20 may be included in the shape of a die 10 but not pass through the plane of the braces 16. Accordingly, the braces 16 do not need to be cut to clear the nicks 20. Rather than requiring in the protocol that the input file be prepared with the nicks deleted, step 32 may include a conversion routine that scans the input file for nicks 20 and replaces them with a line segment. To locate nicks 20, the nick removing routine searches for shapes within or similar to a specification, which may be input by the user or contained in pre-existing configuration file, for the shape of a nick 20. The conversion routine or program may also account for input files that contain shape information relating to the point of the cutting edge 14, as is typical. Since the point of the cutting edge 14 may be offset from the side of the knife 12 that will contact a brace 16, this offset must be accounted for. A similar offset occurs where there are punches or other items to be supported by braces 16 within a die 10. Offset relating to these internal items may be accounted for in step 42, for example, by increasing the size of such internal features as required by the offset. Optionally, some functions in step 42 may be performed after the shapes of the braces are determined. For example, the offset between the side of the perimeter knife 12 and the point of the cutting edge 14 may be accounted for by adjusting the shapes of the braces after they are determined.

In step 44, a die 10 to be braced is selected from the input file. An individual die 10 can be selected, for example, by browsing through a display of all dies 10 and selecting the desired die 10, by selecting from a list of alpha-numerical designations corresponding to the dies 10, or by otherwise indicating the BLOCK number for the desired die 10. The selected die 10 may then be displayed on a screen and the user may be asked to confirm the selection or make another selection. Once an individual die 10 has been selected for bracing, an initialization routine clears any previous shape information and may clear or reset appropriate parameters to default values. The block representing the selected die is copied from the input file for more convenient access by other routines of the bracing program. The name or designation for the die 10 may also be copied into a file location within the bracing program.

In step 46, parameters relevant to the number and location of braces 16 are input. These bracing parameters may be input by the user through the keyboard 34a in response to prompts after the die 10 is selected. Step 46 may also be performed by other means, for example by inputting a parameter file or including the parameters in the general input file for extraction by the bracing program 32. Step 46 may also be performed at other times in the process, for example, before the input file is loaded. The bracing parameters may be based on pre-established guidelines designed to ensure that the bracing will be appropriate and sufficient for the intended use of the die 10. Sets of bracing parameters may be pre-determined for use for various classes or types of dies 10. The classes or types of dies 10 may be determined depending on die 10 geometry, whether there are punches or other internal features and where they are located, mounting requirements for the die 10, the materials used in the die 10, the type of press that the die 10 will be used with or other factors. Thus, the parameters may embody the engineering required to produce an acceptable system of braces 16 for dies 10 of different shapes to be used in similar applications. Alternatively, for example where most or all dies 10 to be braced will have similar requirements, a single set of bracing parameters may be determined and embodied in the bracing program such that step 46 becomes a part of the working of the bracing program hidden from the user. Further alternatively, the bracing program may be adapted to review the die 10 and determine appropriate bracing parameters itself either by computation or by selection from a set of previously entered or programmed bracing parameters.

The set of bracing parameters is chosen in view of the needs of the method that will be used to determine the shape and location of the braces. For the method to be described below, bracing parameters are as described below.

| Bracing Parameter | Description |
|---|---|
| Brace Width | the width of the material that the braces will be cut from |
| Starting Brace Center Point from Edge | the perpendicular distance to the edge of the die of the centerline of the edge braces |
| The Edge Bracing Extra Support Length | the maximum length of the outer edge of an edge brace permitted when the edge brace is located at the Starting Brace Center Point from Edge distance |
| Start Brace Center from Edge if Over Support parameter | the perpendicular distance from the centerline of an edge brace to the edge of the die to be used if the Edge Bracing Extra Support Length is exceeded |
| Minimum Brace Spacing | the minimum spacing between the centerlines of adjacent edge or interior braces |
| Maximum Brace Spacing | the maximum spacing between the centerlines of adjacent edge or interior braces |
| Internal Bracing Support Length | a length for internal edges of braces which, if exceed, indicates that extra support bracing is required |
| Brace Mounting Hole Diameter | the diameter of the mounting holes for the braces as modified, if appropriate, for any offsets of a computer controlled device that will cut the holes |
| Brace Mounting Distance from Edge | the distance from the edge of a brace used to determine the center points of any mounting holes |

Other parameters may also be required by the bracing program 32, and can be input at the same time as step 46 or at other appropriate times. For example, parameters representing the offset of the point of the cutting edge 14 to the side of the knife 12 may be entered directly or by specifying the type of material used for the knife 12 and having the program reference a table of offsets for different materials. Parameters representing the offset of the cutting point and side of a punch or other internal feature of the die may also be entered in a similar manner. Parameters representing the shape of nicks 20 may be entered if nicks 20 are to be identified and removed by the bracing program. Nick parameters may include the minimum length of one of the lines forming the nick 20, the maximum length of the nick 20 along the die perimeter, the minimum included angle of the nick 20 or the minimum angle formed between a first side of the nick 20 and an adjacent die 10 segment. Other parameters may also be useful for additional features in other steps. For example, if the bracing program 32 is capable of detecting and correcting discontinuities in the shape the die 10, a radius may be specified for searching for adjacent un-joined line segments. Another parameter may indicate whether holes are required or not. The various parameters may be entered all at one time or the parameters may be input at multiple times dispersed throughout the overall process.

In step 48, the number and location of braces is determined. Step 48 can be broken into various sub-steps shown in FIG. 5.

Figure 5:
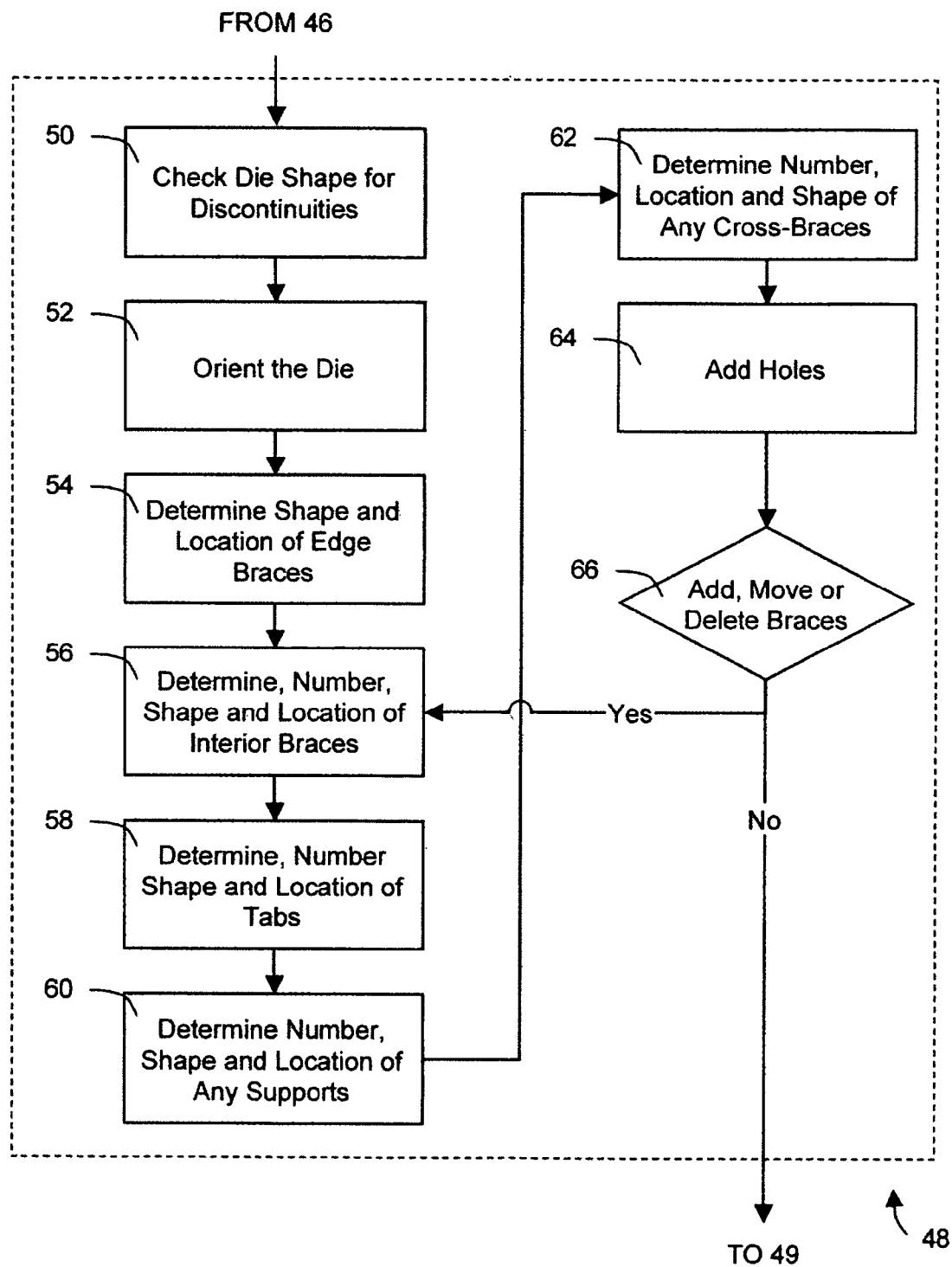
FIG. 5 is a flow chart of the sub-steps within step 48 of FIG. 4.

Referring now to FIGS. 1, 3, and 5, the die 10 is checked for any discontinuities in its perimeter at step 50. If any discontinuities are detected, a subroutine may be invoked to search for adjacent un-joined line segments within a specified radius and propose a method of joining the segments. If no adjacent un-joined segment is found, or if the proposed joinder produces unacceptable results as shown on a screen, the operator may terminate the program. Possible discontinuities may also be dealt with as part of step 42 or by requiring continuous shapes in the input file protocol.

In step 52, the die 10 is oriented to a reference direction. In the following description, the reference direction is assumed to be horizontal, although other reference directions may be used with appropriate modification. To orient the die 10, a rectangular outline of the die 10 is drawn having horizontal and vertical sides touching the outer edges of the die 10. The die 10 is fully contained within the rectangle but the rectangle is no larger than required to fully contain the die 10. The die 10 is then rotated in increments through a specified range of rotation. At each angle, a new rectangle is drawn and the area of the new rectangle is determined and stored. After the die 10 has been rotated through the specified range of rotation, the areas of the rectangles at each rotation are compared and the die is returned to the rotation that produced the rectangle of the smallest area. This step may be performed fully automatically where, by drafting convention or the input protocol, the dies 10 tend to be oriented generally horizontally in the input file or the range of rotation is large enough to account for randomly oriented dies 10. In an operator assisted variation, the operator may initially rotate the die 10 to a position that appears would give the smallest rectangle or in which the features of shape of the die 10 are primarily either vertical or horizontal. Step 52 may then be performed as described above through a more limited range of rotation. Once the smallest rectangle has been found, the die 10 is rotated again, if necessary, so that the longest side of the rectangle of minimum area is horizontal.

In step 54, the location and shape of the edge braces 16 are determined. This is done by first drawing two edge braces 16 of the specified Brace Width. The centerlines of the edge braces 16 are vertical and spaced at the Starting Brace Center Point from Edge distance from the furthest left and right points on the die 10. The shape of the ends of the edge braces 16 is determined by intersection with the perimeter of the die 10. The length of the outside edge of each edge braces 16 is then determined. If either edge brace has an outside edge longer than the Edge Bracing Extra Support Length, then that edge brace is relocated so that its centerline is at the Start Brace Center from Edge if Over Support distance from the furthest left or right, as appropriate, edge of the die 10. The Start Brace Center from Edge if Over Support distance is larger than the Starting Brace Center Point from Edge distance since tab braces 16 may be added as described in step 58 (described below).

In step 56, the number, shape and location of interior braces 16 is determined. To do this, the horizontal distance between the centerlines of the edge braces 16 is determined. This horizontal distance is divided into a number of equal parts that produces the lowest number of internal braces 16 spaced between the Minimum Brace Spacing and Maximum Brace Spacing. Internal braces 16 are drawn with their centerlines vertical and passing through points dividing the horizontal distance into a number of equal parts. End shapes of the internal braces 16 are determined by intersection with the perimeter of the die 10.

In step 58, the number shape and location of any tab braces 16 is determined. To do this, the length of the outer edge of any edge brace 16 located at the Start Brace Center from Edge if Over Support distance is determined. If this length is greater than the Edge Bracing Extra Support Length, tab braces 16 will be provided. If so, the length is divided by the Edge Bracing Extra Support Length and the resulting number is truncated to a whole number representing the number of tab braces 16 required. The location of these tab braces 16 along the edge braces 16 is then determined by dividing the length of the exterior edge of the edge brace 16 by the whole number plus one. Tab braces 16 are located with their centerlines horizontal and passing through the division points. One end of each tab 16 is cut square, the other is shaped by intersection with the perimeter of the die 10.

In step 60, the number, shape and location of any support braces 16 are determined. To do this, each pair of adjacent vertical braces 16 is considered. Internal braces 16 will be considered as part of two pairs while edge braces 16 are only considered as part of one pair. For each pair of braces 16, the length of the right edge of the left brace 16 and the left edge of the right brace 16 is determined. If either edge is longer than the Internal Bracing Support Length, then supports 16 will be added. To locate the support braces 16, the longer edge is divided by the Internal Bracing Support Length and the resulting number is truncated to a whole number representing the number of support braces 16 required for that pair of vertical braces 16. The longer edge is then divided by the whole number plus one and support braces 16 are added with their centerlines horizontal and passing through the points of division. The ends of each support brace 16 has a squared off shape. Alternate routines for providing support braces may also be used. For example, the program may first provide supports to the right edge of the left brace 16 of a pair and then check the left edge of the right brace of the pair to determine if it still has a need for more support braces 16.

In step 62, the number, location and shape of any crossbraces is determined. To do this, the layer in the input file 33 which may contain information about punches or other internal elements according to the protocol is checked to determine whether there are any such elements. The maximum dimension of any internal feature, plus any offset if appropriate, is compared to the Brace Width. For internal features smaller than the Brace Width, a cross brace 16 is added with its centerline oriented along the shortest vertical or horizontal line to any other brace 16. For larger internal features, two or more braces are drawn side by side to provide the required width. For very large internal features, the user may modify the cross-bracing determined by the program as appropriate.

In step 64, mounting holes 18, if any, are automatically placed at the end of a brace 16 that intersects with the die 10 perimeter. Whether there are to be any holes depends on the intended use of the die 10 as communicated to the program by an input parameter. The bracing program 32 calculates the placement of the mounting holes 18 in the following manner: (i) the longitudinal centerline of the brace is found to divide the brace 16 into two half widths; (ii) for each brace half-width, a line perpendicular to the brace centerline through the most interior point where the half-width intersects the die perimeter is found; and (iii) mounting holes 18 are placed at the Brace Mounting Distance horizontally inward from the brace 16 edge vertically inward from the line described above. The mounting holes 18 are made to have the Brace Mounting Hole Diameter. Mounting holes 18 are also placed at the center of a brace 16 if the brace length is greater than 10". If the brace length is less than 1.5" and both ends intersect with the die perimeter, two mounting holes 18 are placed in the centre of the brace 16. When automatic brace placement is complete, the braces are numbered or otherwise identified.

In step 66, the bracing may be modified by the user by moving, adding or deleting braces 16. For this purpose, the bracing scenario is shown to the user on screen of the computer 31. The user may then add, move or delete a brace 16 by any convenient input devices. Once relocated or added, braces 16 are re-numbered and there may be an automatic or manual adjustment of other braces 16, i.e. internal braces. Before permitting a brace 16 to be added or moved, the bracing program 32 may check for compliance with location rules, such as the following rules: (i) that the brace 16 must lie within the die 10, (ii) the brace 16 cannot be located within a pre-existing brace 16, (iii) the end of a brace 16 may not intersect both another brace 16 and the die 10 exterior, and (iv) an angled brace 16 can not overlap other braces 16, and vice versa. A request to add a horizontal or vertical brace 16 across another brace 16 may be interpreted as a request for multiple braces 16 in line. Braces 16 may be added, moved or deleted to achieve the results as described in FIGS. 2B, 2D, 2E or 2F. While these modifications may be performed by the user in the embodiment described, the program may alternately be modified to achieve similar results.

One example of a special case is a die, such as an L-shaped die, that does not fit the rectangular model used in the method. Such dies may be instead separated into two rectangular regions with braces in each region parallel to the smallest dimension of that region. The bracing program 32 may be modified to locate L-shaped dies by comparing the lengths of successive braces 16 and, if an increase in length beyond a parameter is found, rotating the reference direction for an area above the last brace (before the large increase in brace length) and re-drawing the braces for that area. Dies that have long interior protrusions or corners need support at those corners. Braces on these dies need to be positioned such that the interior corner is supported. In these cases, the braces are positioned according to the method above, but then one of the interior braces is moved until it supports the corner without a cutout in the brace, provided that the movement still meets the minimum and maximum spacing rules. This can also be achieved in the bracing program 32 by searching for these features and then moving the closest brace towards the feature in small steps until the corner is supported. Then, the perimeter of the die is checked to determine if the unsupported length of any section of knife 12 has increased such that an additional brace is required. Large rectangular or square dies having a smallest dimension of greater than 8 inches may be braced on all four sides with perpendicular tabs linking the bases to the outside of the die. The perpendicular tabs should be spaced according to the above method.

Referring again to FIGS. 1, 3 and 4, the shape, quantity and location of braces 16 for a given die 10 are provided as an output in step 49. The output may take any convenient form. For example, the output may be the output file 35 produced in a form suitable for further processing, such as by the brace-making machine 38. Alternately, the bracing scenario generated by the bracing program 32 may be presented visually, such as in a drawing file or printed drawing of the braces 16 or of a braced die 10. Before output, the braces 16 may be automatically numbered sequentially from left to right and from top to bottom if not previously numbered in the program.

Figure 6:
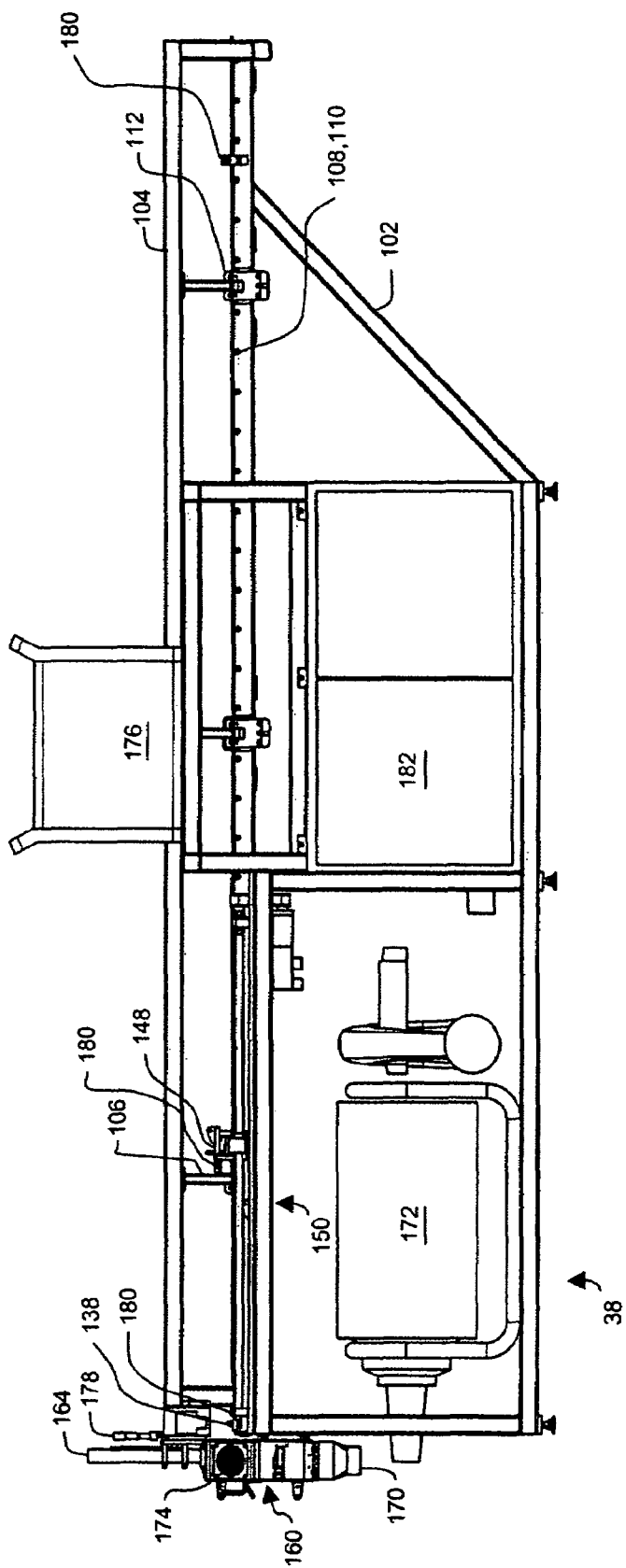
FIG. 6 is a front elevation view of a brace-making machine.
Figure 7:
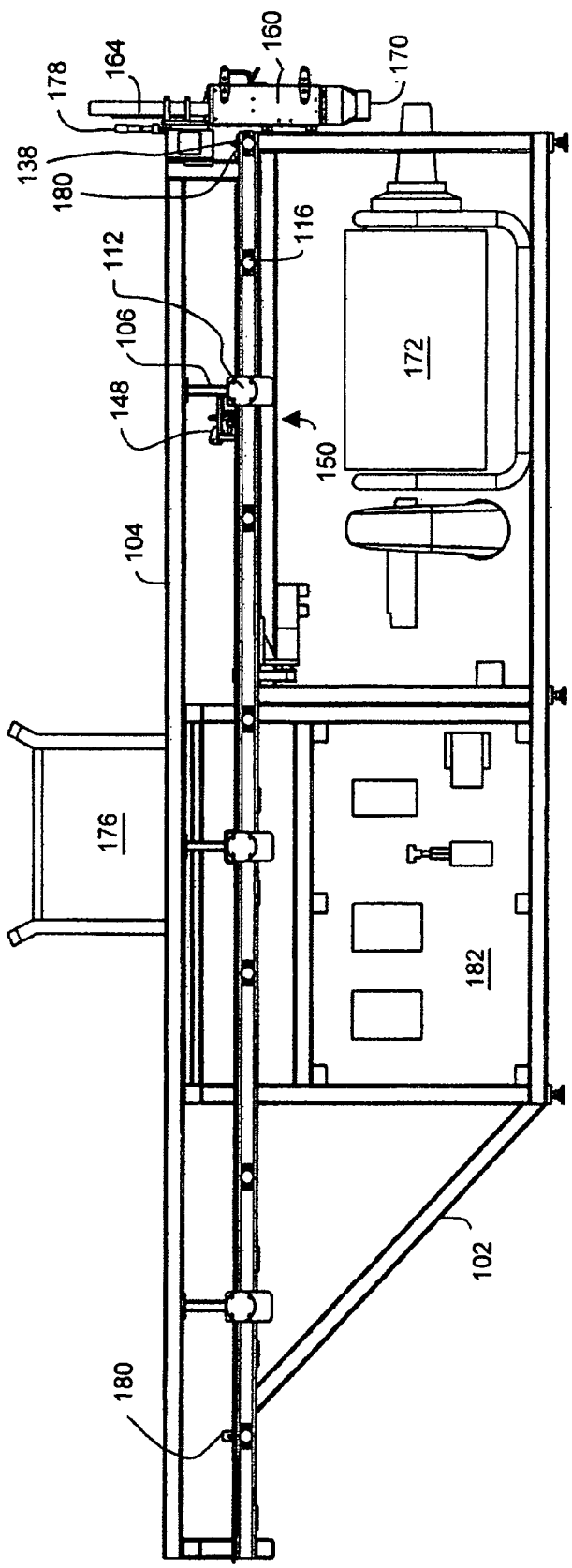
FIG. 7 is a back elevation view of the brace-making machine.
Figure 8:
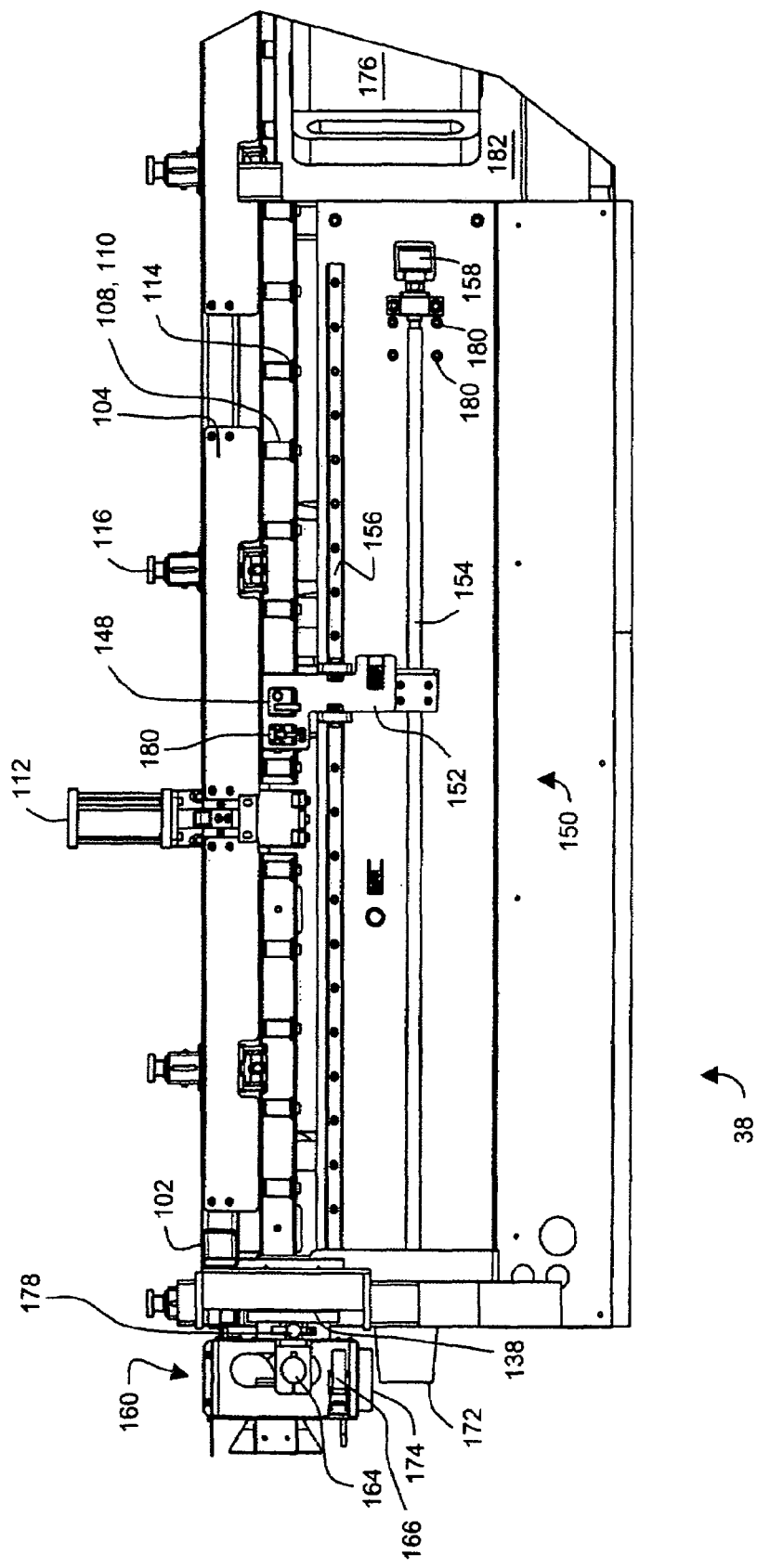
FIG. 8 is a partial plan view of the brace-making machine.

FIGS. 6-8 show the brace-making machine 38 (also referred to as the apparatus) which preferably cuts braces 16 from strip stock (not shown). The strip stock is typically made of steel. Strip stock suitable for braces may come in a variety of widths ranging from about ⅝ to 2 inches or more, a variety of thickness ranging from about ⅛ to ¼ inch and lengths, which may be random, ranging from about 8 to 16 feet. Each strip is generally straight, but typically has some curvature along its length in planes both normal to and parallel with the width of the strip.

Brace-making machine 38 has a frame 102 that supports its various components. A portion of frame 102 forms a hopper 104 that supports a stack of strips of feed material. Hopper 104 includes vertical barriers 106 separating the hopper from a bed 108 formed by a series of rollers 110. The vertical barriers 106 are suspended from the frame 102 and extend downwards but do not touch the bottom of the hopper 104. A gap between the vertical barriers 106 and the bottom of the hopper 104 is provided so that a single strip of material may slide through the gap while remaining strips are retained in the hopper 104.

A series of piston assemblies 112 are mounted to the frame 102 and operable to push a strip of material onto the rollers 110.

Figure 10:
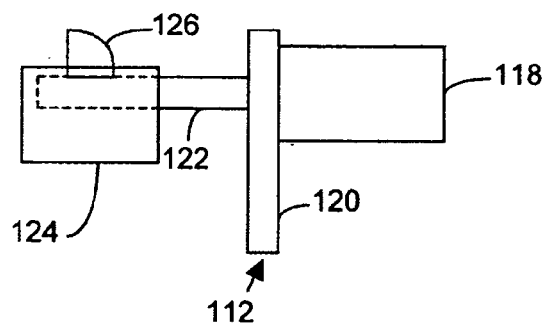
FIG. 10 is a schematic representation of a piston unit of the brace-making machine.

Referring now to FIGS. 6 and 10, the piston assembly 112 has a pneumatic cylinder 118 attached to a piston mounting bracket 120 for mounting the piston assembly 112 to the frame 102. The cylinder 118 drives a piston shaft 122 moving within a spacing block 124 that keeps the top of the piston shaft 122 in or below the plane of the bottom of the hopper 104. An abutment 126 projects above the top of the piston shaft 122 to a height which allows it to engage a single strip of material on the bottom of the hopper 104 without contacting a second strip. Actuating the pneumatic cylinder 118 causes the piston shaft 122 to extend which causes the abutment 126 to push a strip of material onto the rollers 110.

Referring again to FIGS. 6-8, and to FIG. 8 in particular, the rollers 110 have flanges 114 which define a reference edge of the bed 108 and prevent the strip of material from being pushed past the reference edge. A series of guide mechanisms 116 are mounted to the other edge of the bed 108 opposite the reference edge.

Figure 11:
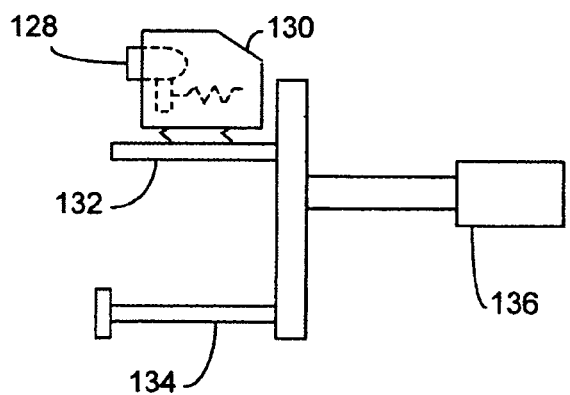
FIG. 11 is a schematic representation of a guide mechanism of the brace-making machine.

Referring now to FIGS. 6 and 11, the guide mechanisms 116 have a vertical roller 128 held within an angled block 130. The vertical roller 128 is attached to the angled block 130 with a spring that biases the vertical roller 128 towards the front of the brace-making machine 38. When the strip of material is on the bed 108, the vertical rollers 128 apply pressure to the edge of the strip to bias the strip of material towards the flanges 114 of the rollers 110 of the bed 108. However, the angled block 130 is itself mounted through a spring to a guide base 132 so that it is lowered out of the way by the weight and pressure of a strip of material being pushed by the piston assemblies 112 from the hopper 104 to the bed 108. The angled block 130 moves back upwards to allow the vertical rollers 128 to contact the edge of the strip after the strip is on the bed 108. To accommodate different widths of strip material despite the limited range of movement of the vertical rollers 128, the guide base 132 is mounted to the frame 102 through pins 134. A thumbscrew 136 may be turned to slide the guide base 132 along the pins 134 to a position appropriate for strips of various widths. The spring biasing of the vertical rollers 128 allows them to hold the strip material against the reference edge of the bed 108 despite any longitudinal curvature of the strip material in the plane of the width of the material.

Referring again to FIGS. 6-8, and FIG. 8 in particular, a piece of strip stock on the bed 108 may be held by either of two clamps. The first is a front clamp located at the front of the bed 108.

Figure 9:
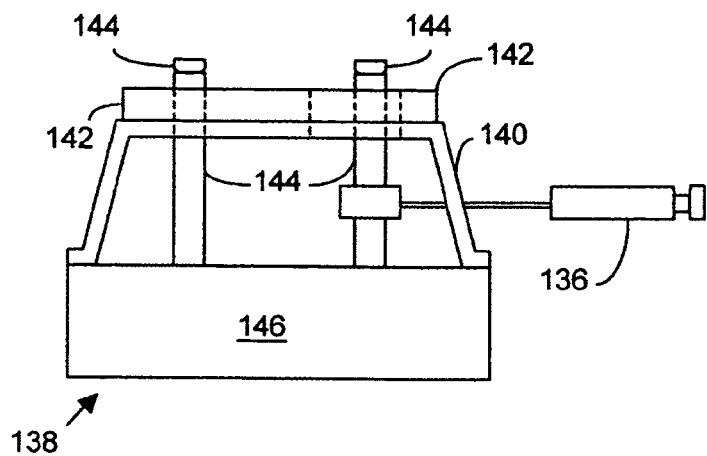
FIG. 9 is a schematic representation of an end clamp of the brace-making machine.

Referring to FIGS. 6 and 9, the front clamp 138 includes a mounting bracket 140 for supporting the various parts of the front clamp 138 and for mounting the front clamp 138 to the frame 102. The front clamp 138 also has a wear plate 142 that a strip of material to be cut may rest on. A pair of clamping rollers 144 pass through the wear plate 142 and are attached to a clamp actuator 146. The clamp actuator 146, when actuated, pulls the clamping rollers 144 towards the wear plate 142 to hold a strip of material clamped against the wear plate 142. When released, the clamping rollers 144 allow the strip of material to slide along the wear plate 142 but may be set to keep the strip of material near the wear plate 142 to counter any curvature of the strip material tending to lift the strip material off of the bed 108. One of the clamping rollers 144 is attached to a thumbscrew 136 that permits the distance between the clamping rollers 144 to be altered to accommodate strip materials of various widths.

Referring again to FIGS. 6-8, the second clamp is a material feed clamp 148 provided as part of a material feeder 150. Material feed clamp 148 is an electromagnetic clamp positioned above the bed 108 such that, when activated, it attaches to the strip of material on the bed 108. Components of the bed 108, particularly the rollers 110 may be made of non-ferrous materials, such as brass or bronze, so as to not interfere with the operation of the material feed clamp 148. Material feed clamp 148 is attached to a feeder arm 152 driven linearly by material feeder screw 154 along guide 156. Material feeder screw 156 is in turn driven with material feed servo 158 such that material feed clamp 148 is capable of moving in two directions, either advancing or retracting a strip of material along the bed 108. Guide 156 ensures that the material feed clamp 148 travels linearly with minimal deviation.

A cutting head 16o at the front of the bed 108 includes a cutting chamber 162, a cutting tool 164 and a cutting tool servo 166. The cutting chamber 162 encloses a space around where the strip material is to be cut and includes a chute 170 for large bits of material to fall through to a receptacle (not shown). The cutting chamber 162 also includes an exhaust port 174 for connection to an exhaust unit 172. Cutting tool 164 is a plasma torch although other cutting tools may also be used. Cutting tool 164 is powered by a cutting tool power supply 176. Cutting tool 164 is movable on a slide assembly and is attached to cutting tool servo 166 such that, by operation of cutting tool servo 166, cutting tool 164 may be moved across the width of a strip of material placed under it by material feeder 150. Cutting tool servo 166 may be operated with the strip of material stationary, optionally clamped by front clamp 138, to provide a square cut across the strip material. Alternately, cutting tool servo 166 and material feed servo 158 may be operated simultaneously to cut a curve or series of line segments across width of the strip. Cutting tool vernier screw 178 allows the height of the cutting tool 164 to be set as required above the strip of material and allows adjustment of that height from time to time as a consumable part of the cutting tool 164 is consumed.

The brace-making machine 38 also has various proximity switches 180 and other sensors. For example, two proximity switches (not shown) are provided with each cylinder 118 to determine whether each cylinder 118 is in either its forward or back position. Another proximity switch 180 is provided near the material feed clamp 148 to determine whether material is near the feed clamp 148. Another proximity switch 180 is provided near the cutting tool 164 to determine if the strip of material is within a known offset from the centre of the cutting tool 164. Two more proximity switches 180 are provided near the material feed servo 158. One of these proximity switches 180 indicates whether the material feeder 150 is in a position representing the feed servo 158 home position. The other indicates whether the feed servo 158 has over-traveled beyond its home position. Two more proximity switches (not shown) are located on the cutting tool slide assembly and determine whether the cutting tool servo 166 is in its home position or whether it has over-traveled. Another proximity switch 180 is located over the bed 108 behind the material feed servo 158 to indicate whether there is a strip of material on the bed 108 behind the feed servo 158 home position. Sensors (not shown) are provided, for example, to indicate whether there is sufficient air pressure to operate the cylinders 118 or to indicate whether an emergency stop button has been pushed. Other proximity switches or sensors may also be provided. In addition, various wires and switches are also provided as required to operate the various components of the brace-making machine 38. For example, switches are provided to activate or de-activate the clamp actuator 146, to turn the exhaust unit on or off, to turn the cutting tool 164 on or off, to advance or retract the cylinders 118 and to engage or disengage the material feed clamp 148. Other controls may also be provided. Many of the components mentioned above are housed within a control cabinet 182.

The control cabinet 182 also houses some parts of a control system 500 that controls the brace-making machine 38.

Figure 12:
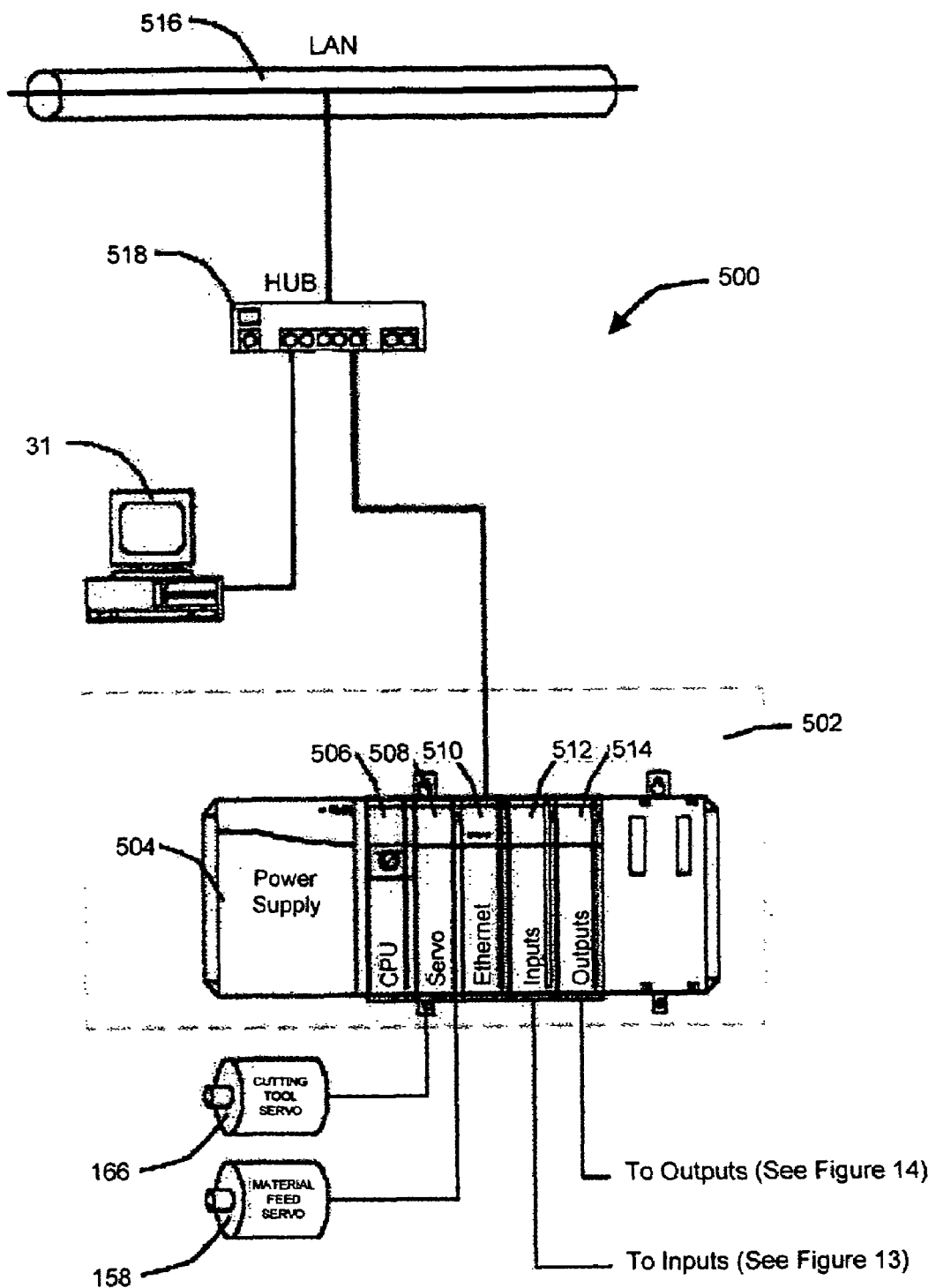
FIGS. 12, 13, and 14 are schematic representations of a computer control system for the brace-making machine.
Figure 13:
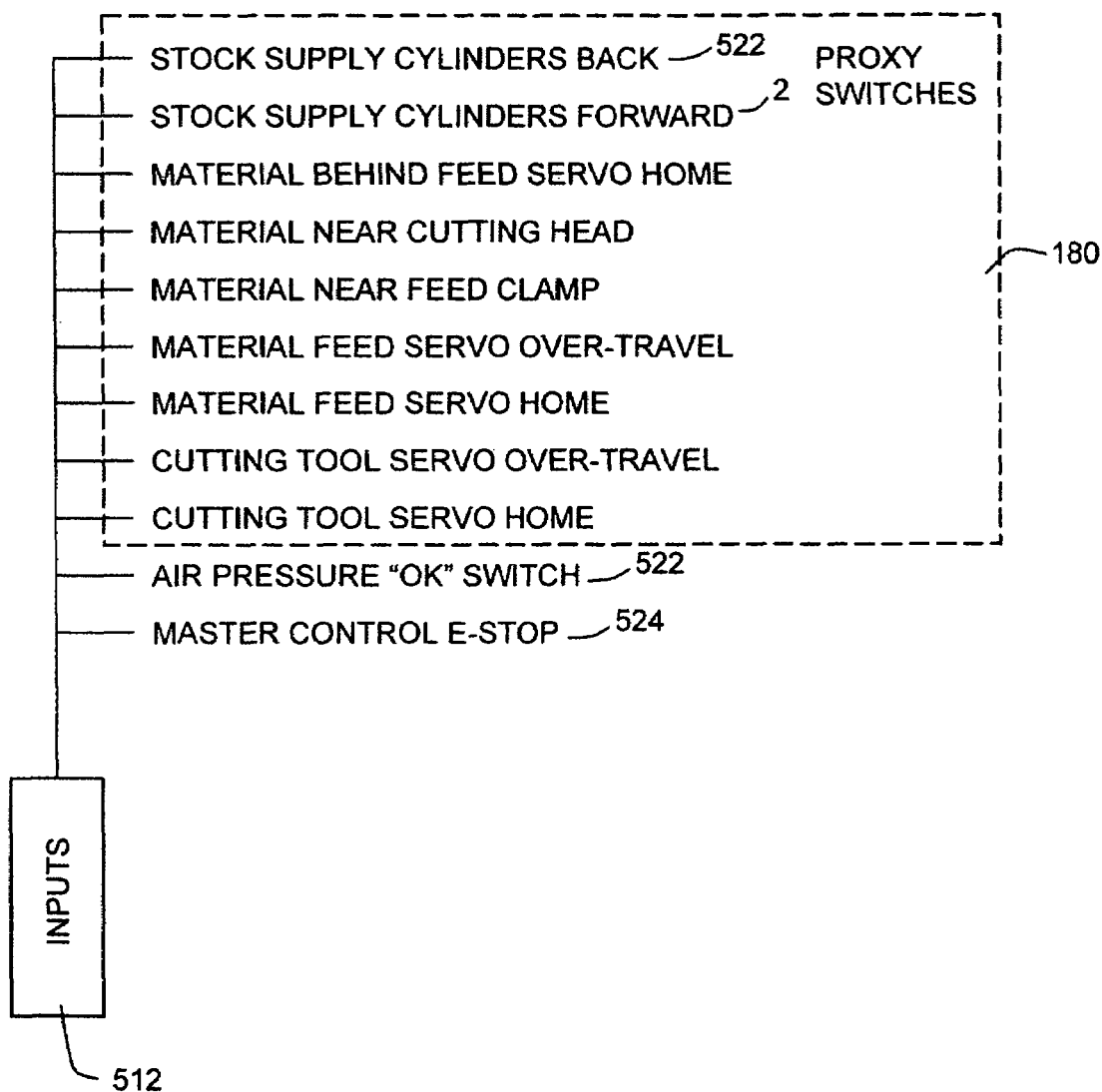
Figure 14:
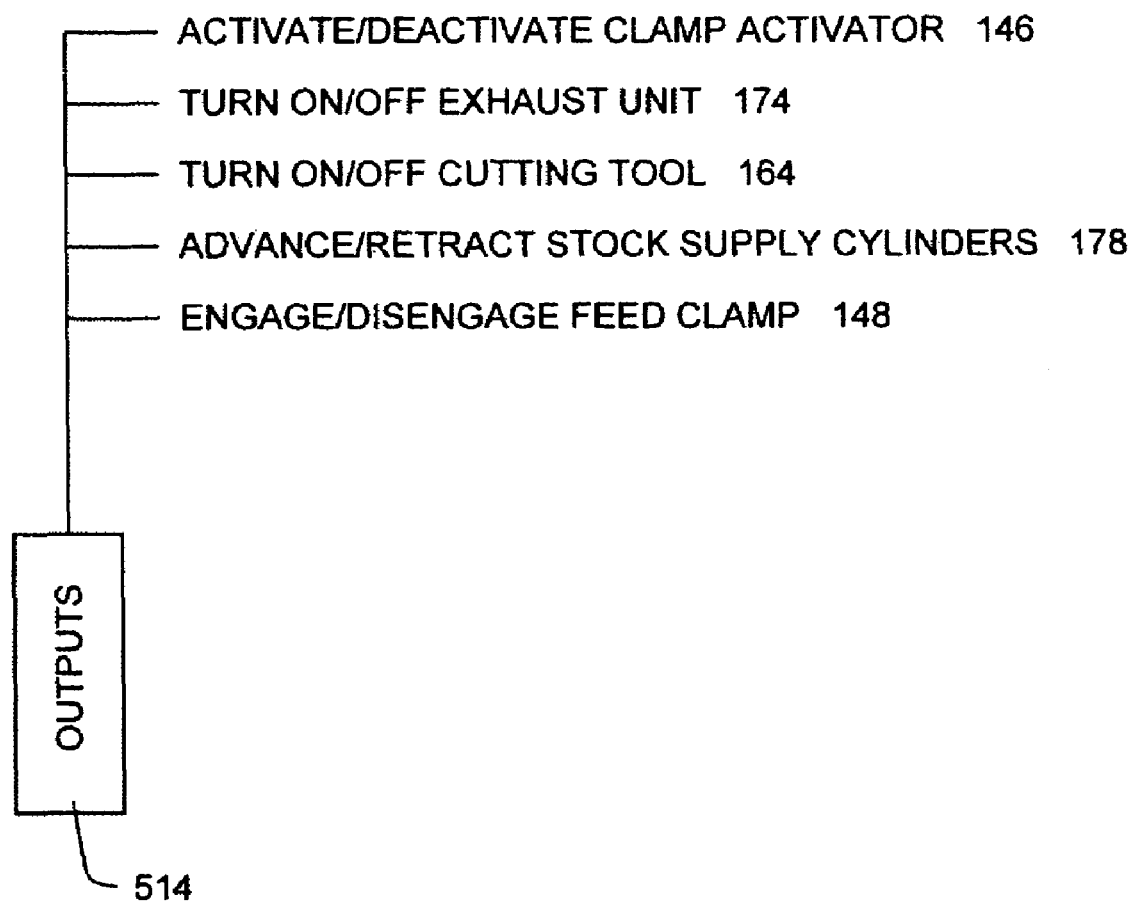

Referring now to FIGS. 12-14, the control system 500 includes a programmable logic controller (PLC) 502. PLC 502 comprises a power supply 504, a CPU 506, a servo controller 508, a communications card 510, an input controller 512 and an output controller 514. Multiple controller or communication cards may be used if desired. For example, there may be two servo controllers 508, one for each servo 158, 166.

Communications card 510 connects PLC 502 to a local area network (LAN) 516 through the use of communications hub 518. The LAN 516 communications hub is a preferred embodiment of the communication network 36 described above and illustrated in FIG. 3. In one embodiment, the LAN 516 makes use of the ethernet protocol but any number of other protocols may be utilized.

Referring now to FIGS. 3 and 12, the computer 31 directs the actions of the PLC 502. The computer 31 preferably communicates with the PLC 502 via LAN 516 and the hub 518. The computer 31 is adapted to store or receive the input file 33 describing the shape of a die and run the bracing program 32 to produce the output file 35 describing the number and shape of braces required to brace a particular die (as described in detail above).

In an alternative embodiment (not shown), the functions of computer 31 may be distributed between two (or more) computers. One computer may run the bracing program 32 and a second computer may control the PLC 502. In such an embodiment, the second computer may include a database of output files 35 containing information on the shape of braces, for example, the shapes of all braces required for a given die. The output files are received from the first computer (which runs the bracing program 32) in any suitable manner, such as via LAN 516.

Referring to FIGS. 3 and 12, an operator operates computer 31 to select or produce the output file 35 containing information regarding the shape of one or more braces. In one embodiment, the output file 35 contains all required information for the brace-making machine 38 to create the braces. The output file 35 is downloaded to PLC 502. This information is downloaded in the form of a modified data exchange file (DXF). Other data files, not in the DXF format, may also be used to contain the information required for brace-making machine 38 to cut a brace. Based upon the downloaded information, PLC 502 then directs the brace-making machine 38 to manufacture the required braces. As the computer 31 is connected to LAN 516, it may receive patterns from or transmit patterns to any other device connected to LAN 516.

Computer 31 and PLC 502 are configured to operate according to a protocol determining what information will be contained in the DXF or other file and how it will be ordered in the file. Depending on the protocol and how information is input to the computer 31, it or PLC 502 or both may be required to perform some data processing operations to produce or use the information in the file which may include running program 32 as described earlier. There are numerous options for the protocol that may be used according to a users preference. In one example, the file downloaded to PLC 502 contains all information relating to the braces 16 required for a selected die 10. This information includes the number of braces 16 to be made, the shape of each brace 16 and the location of any holes in each brace 16. The shape of each brace 16 is defined in the file by a series of co-ordinates, for example X-Y co-ordinates, for the start and end of each line segment forming the shape of the ends of the brace 16, the co-ordinates for the centers of any holes 18 and an overall length of each brace 16. Also included may be various parameters such as the width of the strip of material for the braces 16, the distance between the cutting edge 14 and interior surface of the knife 12, the width or radius of the cut made by the cutting tool 164 and the radius of holes 18. According to the protocol, the computer 31, or an operator using computer 31 will have determined whether any nicks 20 pass through the plane of the braces 16 and adjusted the shape of the braces 16 as described in the input file accordingly. Holes 18 will be shown in the input file by the location of their centers, but the hole diameter will be included as a parameter. Accordingly, PLC 502 performs calculations to determine the required path of the cutting tool 164 considering the desired center and diameter of each hole 18 and the radius of a cut made by the cutting tool 164 in the course of instructing the servos 158, 166 to cut each hole 18. The shape of the ends of each brace 16 will be provided as several line segments corresponding with the shape of the cutting edge 14 of the die 10. Thus, the computer 31 may be required to convert brace 16 or die 10 shapes originally provided in forms other than a series of line segments. PLC 502 is required to account for the distance between the cutting edge 14 and the interior of the knife 12 and the radius of cut of the cutting tool 164 in the course of instructing the servos 158, 166 to cut the ends of the braces 16. Alternately, the computer 31 may be required to pre-process the information in the file to account for these differences before downloading the file to the PLC 502. Rules are also provided relating to any other features of the braces 16, for example, to account for mounting punches or other items that may also be attached to the braces 16. The protocol may also include rules for tagging, ordering or arranging data, such as in blocks or layers, such that PLC 502 may locate and extract information regarding distinct braces 16. The protocol also includes rules regarding the scale and units to be used, for example, that the scale will be 1:1 and all units will be inches. The computer 31 may also be configured to provide other pre-processing of the input file, for example to check for and correct any discontinuities in the shape of a brace 16, to number distinct braces 16 or to determine the shapes of braces 16, the location of holes 18, or other aspects of the braces 16 from other information such as information describing the die 10, for example by running program 32 as described earlier.

The computer 31 may also be used to manually control the brace-making machine 38. For manual control, the computer 31 provides an interface through which an operator may view the information provided by the inputs shown in FIG. 13 and other indicators of system performance. The computer 31 also allows an operator to direct the operation of the servos 158, 166 of FIG. 13 or the outputs shown in FIG. 14 individually. For example, the servos 158, 166 may be homed or moved to a selected distance from the home position and the outputs shown in FIG. 14 or others may be turned on or off, advanced or retraced, engaged or disengaged or activated or de-activated. The computer 31 also allows an operator to enter commands that may over-ride or modify an automated function on the PLC 502. For example, an operator may stop, pause or reset an operation being performed by PLC 502 or re-set or respond to alarms. The computer 31 converts these various commands entered by an operator into signals directing the PLC 502. The computer 31 may also provide or alter various machine control parameters stored in PLC 502. These parameters may include items such as travel limits for the servos 158, 166, or desired servo speeds. These parameters may also include various offsets such as the distance between the proximity switch 180 near the cutting tool 164 and the centre of a cut made by the cutting tool 164 or between the cutting tool 164 home proximity switch 180 and the reference edge of the bed 108. These offsets are used by the PLC 502 to convert information from the proximity switches 180 to information regarding the actual location of the strip of material being cut, the cutting tool 164 or the feed clamp 148.

Referring again to FIG. 12, each component of the PLC 502 will now be discussed in more detail. Power supply 504 provides the power for PLC 502. CPU 506 controls the overall processing of PLC 502. Servo controller 508 controls cutting tool servo 166 and material feed servo 158. Cutting tool servo 166 advances or retracts cutting tool 164 and feed servo 158 advances or retracts material feeder 150. Communication card 510 connects PLC 502 to hub 518 and thus to control the computer 31. Input controller 512 controls a plurality of inputs devices as shown in FIG. 13. Each input device determines the status of a component of the brace-making machine 38. The inputs include a number of proxy switches 180 described above which are grouped together in a dashed rectangle within FIG. 13. Other inputs include an air pressure switch 522 and a master control relay emergency stop button 524. Air pressure switch 522 determines if air pressure is sufficient to operate the cylinders 118 or any other component of the bracing machine 38 that is pneumatically powered. Master control stop button 524 detects whether an operator has pressed an emergency stop button and, if so, cuts power to the machine 38. Other inputs may be added as desired.

Output controller 514 controls a various components of the machine 38, as shown in FIG. 14. Control of these components typically occurs through various ancillary components not shown. For example, clamp actuator 146, exhaust unit 174, cutting tool 164 and feed clamp 148 are all electrically powered. The output controller 514 controls these components through various switches or relays. Cylinders 118 are pneumatically powered and the output controller 514 controls them through an appropriate combination of components such as relays, solenoids and valves. Other controls may be added to provide other functions. For example, a printer may be added to place a part or serial number on a label on each brace cut or a cleaner may be added to clean the braces before they leave the machine 38. Cleaning and labeling may also occur before a brace is cut.

Figure 15:
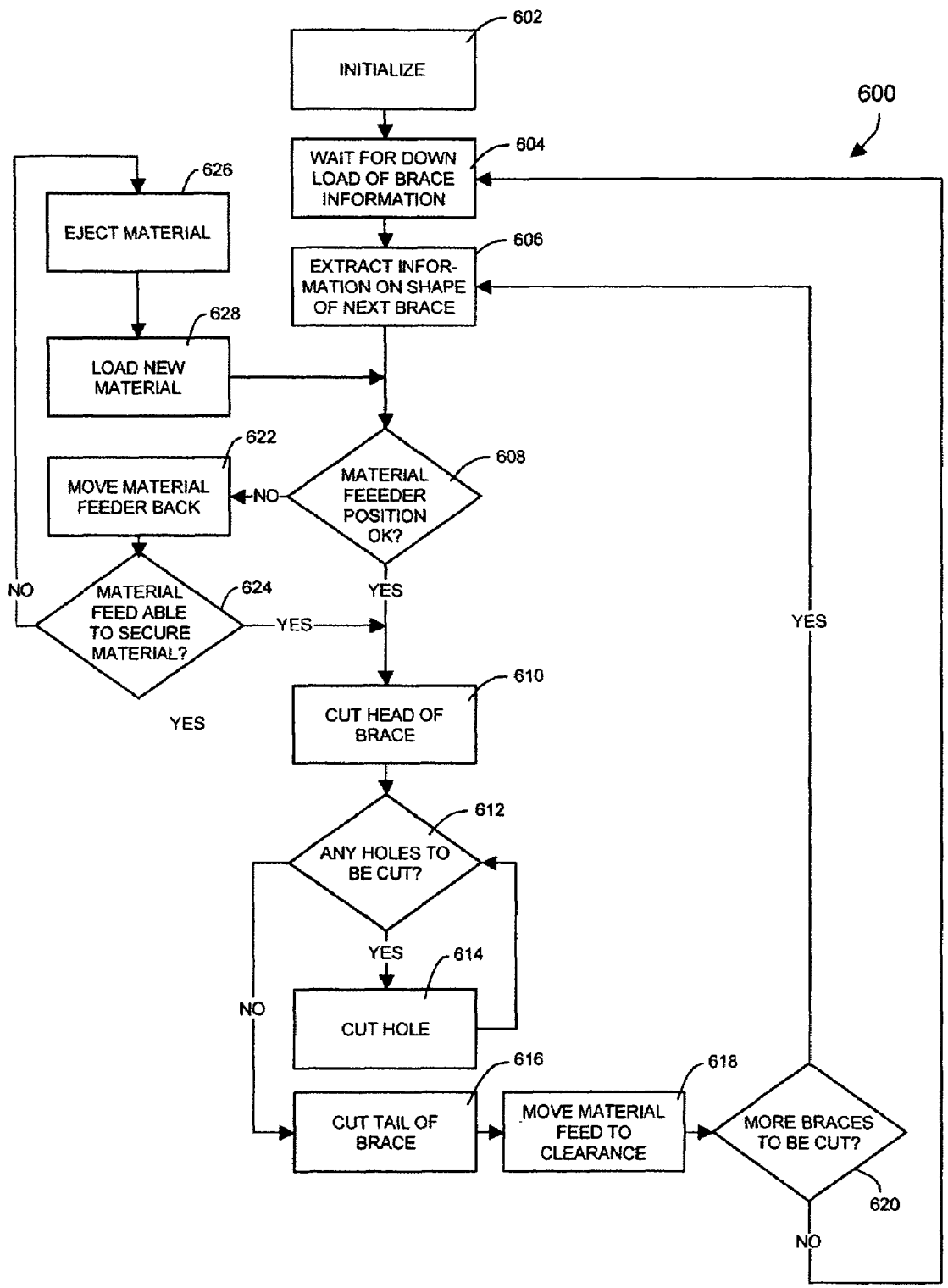
FIG. 15 is a flow chart of method of producing a brace.

FIG. 15 shows the cutting process 600 performed by control system 500. In step 602, the control system 500 and brace-making machine 38 are initialized. This step includes various sub-steps to make the control system 500 and brace-making machine 38 ready for operation. For example, servos 158 and 166 are homed and checks are made to determine if a strip of material is present on the bed 108 with its front edge under the cutting tool 164, if communications links are open and whether the brace-making machine 38 is ready for operation. Steps are performed to overcome any initial deficiencies. For example, a piece of strip of material may be loaded if there is none on the bed 108 or a strip of material on the bed 108 may be moved forward to place its front edge under the cutting tool 164 by at least a minimum clearance distance.

In step 604, the PLC 502 waits for the output file 35 to be downloaded. Once a file is received, processing continues to step 606 in which information regarding a brace 16, which may be a first or next brace 16 to be cut, is extracted. If multiple braces 16 are included in the input file to the PLC 502, which is the output file 35 from the computer 31, the PLC 502 will establish an indexing log or counter indicating the total number of braces to be cut. The counter allows PLC 502 to determine at step 620, to be described below, whether more braces need to be cut.

In step 608, the position of the material feeder 150 is checked to see whether it is over top of a strip of material and far enough away from the cutting tool 164 to cut the next brace 16. If both conditions are not satisfied, processing moves to step 622 where the material feeder 150 is moved back to a distance behind the cutting tool 164 at least as large as the overall length of the brace 16 to be cut plus a minimum operating clearance. To move the material feeder 150, front clamp 138 is first engaged and material feed clamp 148 disengaged so that the strip of material will not move. Material feed servo 148 is then operated to move the material feeder 150 back. In step 624, a check is made to see if the material feeder 150 was capable of secure sufficient strip material for the next brace 16. The check may include monitoring the proximity sensor 180 that determines whether the material feeder 150 has over-traveled. Over-travel may occur if an operator attempts to cut a brace larger than the maximum travel, less operating clearances, of the material feeder 150. This possibility may also be avoided by having the computer 31 or PLC 502 check any braces 16 for excess length before attempting to cut them.

Alternately, the control system 500 may be adapted to cut larger braces 16 by allowing the material feeder 150 to relocate itself in relation to a strip being cut while cutting a single brace 16. In the present embodiment, the material feeder 150 holds the strip to be cut at only one location while all cuts are made for a brace 16.

A check is also made of the proximity sensor 180 near the material feed clamp 148 to see if material is present to be clamped. Material will not be present if the strip of material on the bed 108 is too short for the brace 16 to be cut. In this case, the process proceeds to steps 626 and 628 in which the existing material is ejected from the bed 108 and a new piece of material is loaded. Step 626 may be performed by alerting the operator through the computer 31 that the strip is too short. The operator then removes the strip of material and then enters an instruction through the computer 31 indicating that the process may proceed to step 626.

Alternately, steps 626 and 628 may be performed automatically. For the automatic process, material feeder 150 is moved so as to be able to grab near the back edge of the strip. Front clamp 138 is opened, material feed clamp 148 turned on, and material feeder 150 is then moved to its farthest forward travel limit. This moves the strip of material to a position in front of where a new strip to be loaded. The front clamp 138 is then closed, the material feed clamp 148 opened and the material feeder 150 returned to its home position. Cylinders 118 are advanced to push a new strip onto the bed 108. Material feed clamp 148 is closed on the new strip and the cylinder 118 are retracted. Proximity switches 180 are checked to verify that all cylinders advance and retract as required. The material feeder 150 is then moved forward by a pre-set distance sufficient to put the front edge if the new strip under the cutting tool 164 which also ejects the old strip through the front of the cutting chamber 162.

In step 608, the current position of the material feeder 150 is also checked to make sure the rear or front travel limits will not be reached when moving the steel during a cut. For this check, the peak to peak distance of the head cut is added to the current position of the material feeder 150 and the result checked to make sure that the limits of the material feeder 150 will not be reached. If a limit would be reached, then the material feeder 150 is moved without moving the feed stock as required so that the cut may be made without requiring the material feeder 150 to be repositioned relative to the feed in the middle of a cut.

When the checks in step 608 have been satisfied, the process proceeds to step 610. In step 610 the head, or front edge, of the brace 16 is cut. To make the cut, the PLC 502 generates a profile of the cut and array of instructions to the servos 158, 166. The servos 158, 166 are moved to the first co-ordinate in the profile. The cutting tool 164 is then turned on and the servos 158, 166 are run through their profile moves. The cutting tool 164 is then turned off.

In steps 612 and 614, the control system 500 checks whether the holes 18 are required, and if so, cuts the holes 18. To facilitate checking whether there are any holes to be cut, the PLC 502 notes the total number of holes to be cut and maintains a counter as each hole 18 is cut. Each holes 18 is cut in a manner similar to that described for the cutting the head of the brace 16. When all holes 18 are cut, the process proceeds to step 616 where the tail of the brace 16 is cut in a manner similar to how the head of the brace 16 was cut. As the tail is cut, the brace 16 falls through the front of the cutting chamber 162.

After a brace 16 is cut, material feeder 150 is moved forward to a clearance distance sufficient to ensure that the head of the next brace 16 may be cut. The clearance distance accounts for the width of the cut made by the cutting tool 164. The clearance distance also accounts for the possibility that the tail cut on the last brace may have extended forwards towards the end of the cut and backwards from the reference edge of the bed 108. In this case, a solid width of material is not left under the path of travel of the cutting tool 164 and the proximity sensor 180 near the cutting tool 164 can not be used to determine by how much the strip needs to be advanced to correct the problem.

The clearance distance may be set in the protocol and braces 16 that would cause a problem despite the clearance distance would not be allowed. Alternatively, the total length of brace 16 information in the input file may be used to establish a clearance for each brace. Alternatively, the computer 31 may compare the tail and head cut shapes of braces 16 and, with consideration for the width of cut, determine a distance for the material feeder 150 to move in step 618 and include this in the input file. In this way, strip material is saved since the PLC 520 may reduce the clearance distance in cases where the tail of one brace 16 has a shape similar to the head of the next brace 16 to be cut.

After step 618, the process continues to step 620 where the index is consulted to see if there are more braces to cut. If so, then the process returns to step 606. If not, then the process returns to step 604. The process is thus continuous, but may be terminated by the operator through the computer 31 when the operator is finished cutting braces.

Although the invention has been described with reference to certain specific embodiments, various modifications can be made without departing from the spirit and scope of the invention as described in the following claims. In particular, but without limitation, the program 32 may be modified, other forms of cutters may be used, modified systems may be used to move the strip of material and the cutter, the configuration of the machine may be changed, different types of clamps, actuators, guides or piston assemblies may be used, other parts may be substituted for parts suitable for performing the same tasks, the protocol may be changed and the series of steps performed may be modified. Further, although the systems and methods have been described for use in making braces for dies, they, or parts of them, may be adapted or used in other situations where a piece of strip stock is designed or cut to fit to a boundary.

The invention claimed is:

1. An apparatus for producing a brace for a cavity die from a strip of material, the apparatus comprising:

a) a bed for supporting the strip of material, the bed including a plurality of flanges along a first side of the bed and which define a reference edge;

b) a material feeder for moving the strip of material in a first direction generally parallel to the reference edge;

c) a cutting tool movable in a second direction generally perpendicular to the reference edge across the strip of material;

d) a control system for coordinating the movement of the material feeder and cutting tool to make a desired cut in the strip of material;

e) a piston assembly mounted to a second side of the bed opposite the first side of the bed, the piston assembly adapted to push the strip of material generally in the second direction from a hopper located along the second side of the bed onto the bed; and f) at least one guide mechanism mounted to the second side of the bed and located adjacent the piston assembly between the hopper and the flanges, the at least one guide mechanism movable between a retracted position and a contact position, wherein in the retracted position the at least one guide mechanism is lowered substantially beneath the bed allowing the piston assembly to push the strip of material generally in the second direction from the hopper onto the bed, and wherein in the contact position the at least one guide mechanism bears against the strip of material on the bed to bias the strip of material against the flanges of the bed.

2. The apparatus of claim 1, further comprising a cutting tool servo adapted to move the cutting tool, and wherein the material feeder comprises a material feed servo adapted to move an electromagnetic clamp.

3. The apparatus of claim 2, wherein the control system comprises a program logic controller, the program logic controller adapted to receive instructions from a computer to cut the braces, the program logic controller adapted to transmit the instructions to the material feeder and the cutting tool, wherein the program logic controller comprises a servo controller operatively connected to the material feed servo and the cutting tool servo.

4. The apparatus of claim 1 wherein each of the at least one guide mechanism includes a vertical roller that is spring biased towards the reference edge of the bed.

5. The apparatus of claim 1 wherein the at least one guide mechanism is positionable at a variable distance from the reference edge.

6. The apparatus of claim 4 wherein the at least one guide mechanism further comprises a block and a guide base, wherein the vertical roller is held within the block and the block is spring mounted to the guide base thereby enabling the block to be lowered in relation to the bed when the strip of material passes from the hopper to the bed.

* * * * *